(12) United States Patent
Zamuner

(10) Patent No.: US 8,552,341 B2
(45) Date of Patent: Oct. 8, 2013

(54) TORCH FOR ARC WELDING GUN

(75) Inventor: Frank Zamuner, Oakville (CA)

(73) Assignee: Lincoln Global, Inc., City of Industry, CA (US)

(*) Notice: Subject to any disclaimer, the term of this patent is extended or adjusted under 35 U.S.C. 154(b) by 2613 days.

(21) Appl. No.: 11/229,239

(22) Filed: Sep. 19, 2005

(65) Prior Publication Data

US 2007/0062922 A1    Mar. 22, 2007

(51) Int. Cl.
*B23K 9/173* (2006.01)

(52) U.S. Cl.
USPC .............................. 219/137.31; 219/137.61

(58) Field of Classification Search
USPC ............. 219/137.31, 137.61, 137.62, 137.63, 219/137.9, 76.11
See application file for complete search history.

(56) References Cited

U.S. PATENT DOCUMENTS

| | | | |
|---|---|---|---|
| 3,243,571 A | | 3/1966 | Schmerling |
| 3,659,076 A | | 4/1972 | Ogden, Sr. |
| 4,158,763 A | * | 6/1979 | Moerke ..................... 219/137.42 |
| 4,313,046 A | * | 1/1982 | Henry et al. ............. 219/137.62 |
| 4,464,560 A | * | 8/1984 | Church et al. ........... 219/137.42 |
| 4,864,099 A | * | 9/1989 | Cusick et al. ............ 219/137.62 |
| 5,313,046 A | | 5/1994 | Zamuner |
| 5,338,917 A | * | 8/1994 | Stuart et al. .............. 219/137.63 |
| 6,209,886 B1 | * | 4/2001 | Estes et al. ....................... 279/50 |
| 6,211,490 B1 | * | 4/2001 | Nosse ...................... 219/137.62 |
| 6,271,497 B1 | * | 8/2001 | Zapletal ................... 219/121.36 |
| 6,414,268 B1 | | 7/2002 | Equiza Equiza et al. |
| 2004/0026394 A1 | | 2/2004 | Giese |

FOREIGN PATENT DOCUMENTS

| | | |
|---|---|---|
| AT | 197 664 B | 5/1958 |
| CA | 2106837 | 3/1994 |
| CA | 2139152 | 7/1995 |
| DE | 89 06 897 U1 | 8/1989 |
| EP | 0 590 728 A | 4/1994 |
| EP | 0590728 | 4/1994 |

(Continued)

OTHER PUBLICATIONS

Canadian Office Action issued to Application No. 2,535,077 on Oct. 30, 2008.

(Continued)

*Primary Examiner* — Brian Jennison
(74) *Attorney, Agent, or Firm* — Hahn Loeser & Parks LLP

(57) ABSTRACT

A welding torch comprising: a main cylindrical conductive assembly with a front diffuser section having a plurality of circumferentially spaced shielding gas diffuser orifices for directing shielding gas radially outwardly from the assembly, a forwardly facing threaded bore extending through a cylindrical support nose and an elongated wire passageway coaxial with the threaded bore and opening at the rear end of the assembly. An insulated, cylindrical protective sleeve fitted around both the support nose and the diffuser orifices where the sleeve has a front clearance opening and circumferentially spaced openings communicated with the diffuser orifices and a contact tip having a central wire guide bore with a diameter only slightly larger than the diameter of the welding wire, a threaded rear body, a front extension passing through the front clearance opening and a radially extending flange between the rear body and the front extension to hold the protective sleeve around the nose when the body is screwed into the threaded bore of the main assembly.

36 Claims, 10 Drawing Sheets

(56) References Cited

FOREIGN PATENT DOCUMENTS

| | | |
|---|---|---|
| EP | 1 053 818 | 11/2000 |
| EP | 06 00 5578 | 12/2006 |
| GB | 2285404 | 7/1995 |
| JP | 59 178183 A | 10/1984 |
| JP | 01 096272 U | 6/1989 |
| JP | 01 309787 A | 12/1989 |
| JP | 2005 169396 A | 6/2005 |

OTHER PUBLICATIONS

Chinese Office Action issued to Application No. 2006100659141 on Sep. 19, 2008.
Chinese Office Action issued to Application No. 2006100659141 on Mar. 13, 2009.
Mexican Office Action dated Mar. 9, 2009 for Application No. 06/04375 including translation.

* cited by examiner

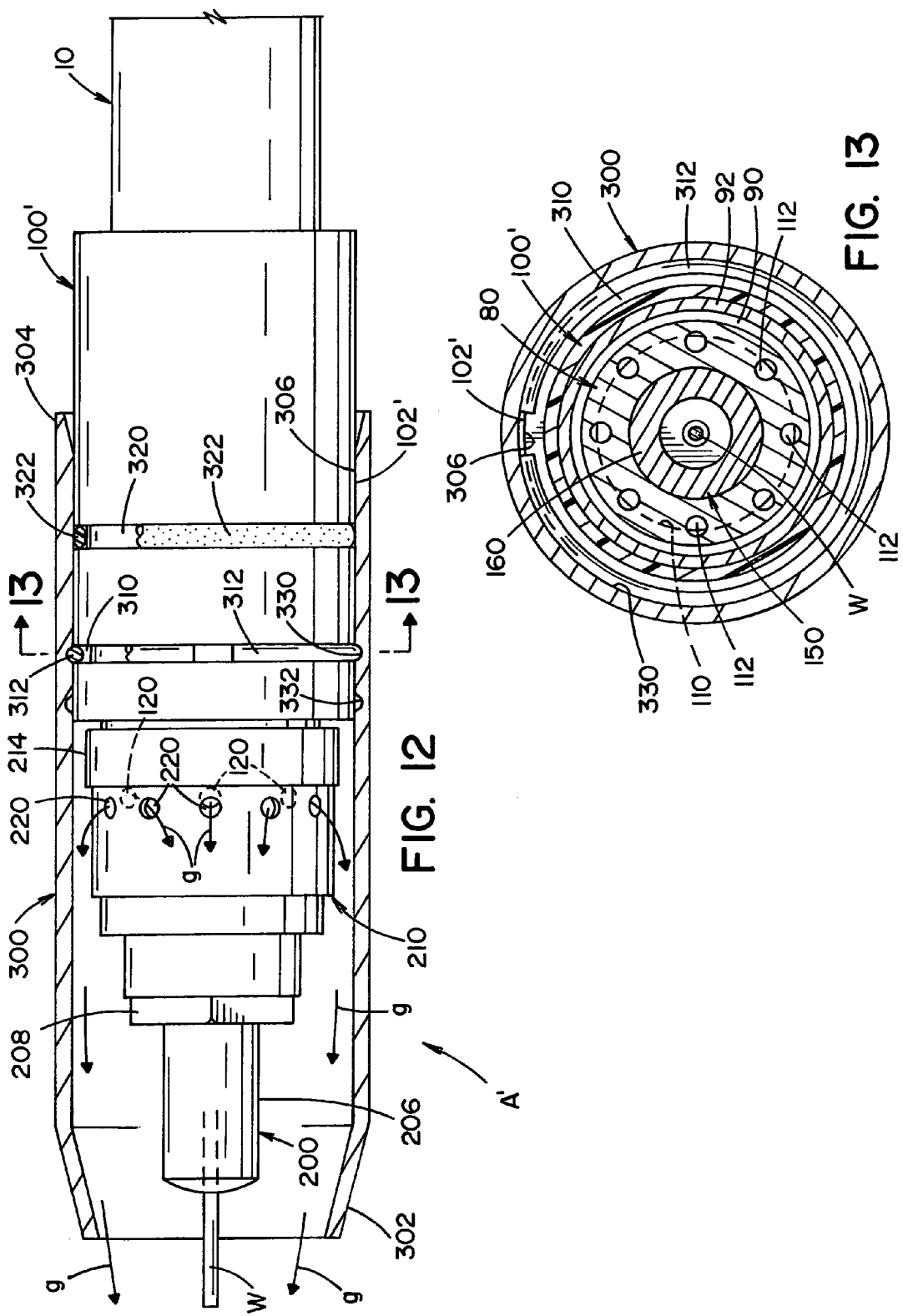

TORCH FOR ARC WELDING GUN

INCORPORATION BY REFERENCE

The design of the torch at the welding end of a gun is the subject of many publications that describe the background of the present invention. Some of these publications are United Kingdom application 2285404; Canadian application 2106837; Canadian application 2139152; European application No. 0590728 A1; and U.S. Pat. 5,313,046. These prior art examples show a welding torch of the type to which the present invention is directed and are incorporated by reference herein as background information. They also describe some of the attributes required for a welding torch.

BACKGROUND OF INVENTION

In electric arc welding, a "gun" is a flexible, elongated element having a rear end connected to a wire feeder and power source and a front end for a welding torch. The gun includes an elongated flexible conduit directing current and shielding gas from the wire feeder to the welding torch. A welding gun is employed for hand held welding and for robotic controlled welding. Many torches are designed to be water cooled; therefore, the flexible tubing from the wire feeder at the rear end to the torch includes a coolant inlet and a coolant outlet to direct liquid coolant, such as water, into the torch around the torch and then back to a reservoir. The torch must, whether water cooled or not, include a contact tip through which the welding wire from the wire feeder is directed to the welding operation. This tip is highly conductive, generally copper, and supported in a conductive cylindrical main assembly. This assembly establishes physical integrity of the torch and receives power from the power source, through the wire feeder. When water cooling is used, conduits within the main assembly direct water around the assembly to maintain a reduced temperature during the welding operation. Shielding gas is directed from a diffuser forming an integral part of the main assembly into an annular chamber defined by an outer replaceable nozzle. Shielding gas from the nozzle flows around the contact tip so the shielding gas forms a protective barrier between the molten metal of the welding operation and the ambient atmosphere. All of these requirements of a welding torch require complex machined components which substantially increases the cost of the torch and adversely affects the operability of the torch during the welding operation. Furthermore, the welding operation itself creates spatter, especially during short circuit conditions, so the forward end of the torch is subject to substantial deterioration over time caused by spatter together with the tremendous arc temperature involved in the welding operation. All of these adverse conditions create restraints in the design of a torch. They are taken into consideration and substantially improved by the present invention, which involves several novel features for the torch portion of the welding gun. A major objective is improving the torch sot it remains cool, especially for a water cooled torch. The design of the cooling jacket on the torch in existing torches has often proved unsatisfactory. It is recognized that the water jacket or chambers of the water cooled torch should be as close as possible to the arc, since the excessive heat comes from the arc itself. The more the torch is allowed to become elevated in temperature, the more troublesome the cooling problem for the torch. Thus, the water cooling passageways in the torch itself must be designed for efficient cooling of the torch and without affecting the cost and/or the physical strength of the torch. This feature is improved by the novel torch of the invention.

Another problem to be solved by the present invention arises from the overheating of the torch end causing rapid deterioration of the electrical insulation in the torch. This insulation material rapidly deteriorates if overheated. Consequently, in the water cooled torch the cooling jacket or passages should be as close as possible to the arc to prevent excessive heating being transmitted to the insulation of the torch. In both water cooled and air cooled torches, shielding gas is directed into the welding operation from diffuser orifices circumferentially spaced around the torch. This gas has a cooling function as it moves around the main assembly to the contact tip at the welding operation. Consequently, torches require diffuser orifices for shielding gas; however, these orifices must be oriented to prevent unwanted cavitation and turbulence. It has been found that these diffuser orifices should be as close as possible to the welding operation. Such closeness drastically increases the tendency for spatter to affect the laminar flow of shielding gas from the diffuser orifices. The present invention is directed to a torch for solving all of these problems to provide an improved torch for an arc welding gun.

THE INVENTION

The present invention relates to an improved welding torch that protects the end of the torch from heat deterioration and damage by excessive spatter, while still maintaining essentially laminar flow of shielding gas to the welding operation.

In accordance with the present invention there is provided an improved torch for directing a welding wire with a given diameter toward a workpiece. The torch comprises a cylindrical conductive main assembly having a diffuser with a plurality of circumferentially spaced shielding gas diffuser orifices for directing shielding gas radially outwardly from the assembly. A forwardly facing threaded bore extending through a cylindrical support nose mounted on the end of the main assembly and an elongated wire passageway coextensive with the threaded bore and opening at the rear end of the main assembly. The passageway is isolated fluid wise from the diffuser orifices. The novel torch also includes an insulated, cylindrical protective sleeve fitted around both the support nose at the end of the main assembly and the diffuser orifices of the main assembly. This protective sleeve has a front clearance opening and circumferentially spaced openings generally aligned with the diffuser orifices or a chamber receiving shielding gas from the orifices. A further component of the improved torch is a contact tip having a central wire guide bore with a diameter only slightly larger than the diameter of the welding wire, a threaded rear body, a front extension passing through the front clearance opening of the sleeve and a radially extending flange between the rear body and the front extension to hold the protective sleeve around the nose fixed on the main assembly when the body is screwed into the threaded bore of the main assembly of the torch. In one embodiment of the invention, the flange is rotatably mounted on the contact tip. Otherwise it is machined integrally with the tip, such as by a screw machine.

When the torch is a water cooled torch, the main assembly includes an inward most coolant passage with an inlet conduit and an outlet conduit provided in the main assembly. The coolant passage is annular and generally coaxial with the threaded bore of the main assembly. In the preferred embodiment, the annular coolant passage has a frontmost portion and the threaded rear body of the contact tip has a rearmost portion, with the portions overlapping. This provides direct heat conductivity from the tip to the coolant passage.

To complete the construction of the improved torch, an insulated sleeve surrounds the main assembly and a cylindrical metal nozzle is provided to define the external handling structure for the torch. The metal nozzle has a rear end held over the insulated sleeve of the cylindrical assembly and a front end flared inwardly forward of the tip so the nozzle is spaced from the protective sleeve to define an annular shielding gas passage from the openings of the sleeve to the front end of the nozzle. In accordance with the preferred embodiment, the rear end of the cylindrical metal nozzle includes a gripping mechanism. One aspect of the present invention is to provide a novel gripping mechanism. This novel gripping mechanism includes a first generally cylindrical collet at the rear end of the nozzle and having at least one axially extending collapsible slot and an outwardly facing cylindrical surface. A second generally cylindrical actuator ring with an inner generally cylindrical surface slides around the outer facing surface of the collet. At least one of the relatively rotatable surfaces is slightly non-circular so rotation of the actuator ring on the collet closes the nozzle slot and clamps the rear end of the nozzle onto the main cylindrical assembly of the torch. Another embodiment of the gripping mechanism does not involve a separate actuator ring, but includes a first cylindrical surface fixed with respect to the main cylindrical assembly of the torch. The first surface has a groove with a snap ring protruding from the first surface. The rear end of the nozzle includes an inner surface generally matching the first surface and has an annular groove to receive and hold the snap ring when the inner surface of the nozzle is slipped axially over the first surface fixed on the main assembly. Thus, the nozzle is merely moved axially onto the main assembly of the nozzle to a position where the groove internal of the nozzle receives and holds the snap ring. In this type of nozzle, there can be a second snap ring receiving groove to define a different axial assembled position of a nozzle onto the main assembly of the torch. Another embodiment of the gripping mechanism is merely a fixed friction surface on the cylindrical surface of the main assembly. The rear of the nozzle includes an inner friction surface generally matching the first friction surface to hold the nozzle onto the first friction surface by frictional force.

The diffuser having circumferentially spaced diffuser orifices and the forward nose are integral with the main assembly. In the air cooled version of the present invention, the integral relationship is formed by threading the nose into the diffuser. In the air cooled version, the integral relationship is by machining the nose as part of the diffuser.

Another aspect of the present invention is the provision of a contact tip for use in a torch for directing welding wire with a given diameter toward a workpiece. The contact tip has a central wire guide bore with a diameter only slightly larger than the diameter of the welding wire, a threaded rear body, a front extension and a radially extending flange between the rear body and the front extension. In one embodiment of the invention, the flange is rotatably mounted on the contact tip. The outer edge of the flange can be circular or non-circular without departing from the intended scope of the invention.

Yet another aspect of the invention is the provision of an insulated cylindrical protective sleeve for mounting around the nose and circumferentially spaced diffuser orifices of a torch. The sleeve has a front clearance opening and circumferentially spaced openings communicated with the diffuser openings when the sleeve is mounted. The protective sleeve has a first inner portion having a cylindrical cavity to match the outside periphery of the nose and a second portion having a cylindrical cavity matching the outer periphery of the diffuser providing the diffuser openings. The protective sleeve is formed from a thermoplastic material that is not substantially eroded by spatter. In practice, the sleeve is formed from tetrafluoroethylene.

The primary object of the present invention is to provide an improved welding torch for mounting on the front end of a welding gun, which torch has structure to protect the front end of the gun from heat deterioration and spatter erosion.

Yet another object of the invention is the provision of a welding torch, as defined above, which welding torch has a protective sleeve to insulate the end of the torch from heat and protect the diffuser orifices from abrasion by spatter.

Another object of the present invention is the provision of a contact tip for a welding torch, which contact tip has an intermediate flange used to hold a surrounding insulated protective sleeve onto the end of the main cylindrical assembly of the torch.

Still a further object of the present invention is the provision of a protective sleeve surrounding the end of the main cylindrical assembly of the torch and also the diffuser orifices of the torch to reduce exposure to high temperatures and prevent spatter abrasion.

Still another object of the present invention is the provision of a novel outer nozzle for a welding torch, which nozzle has a rear gripping mechanism comprising a rotatable actuator ring having an eccentric inner surface rotatable to clamp the rear end of the nozzle onto the outer surface of the torch.

These and other objects and advantages will become apparent from the following description taken together with the accompanying drawings.

BRIEF DESCRIPTION OF DRAWINGS

FIG. 1A is an enlarged, cross-sectional view taken generally along line 1A-1A of FIG. 1;

FIG. 12 is a view similar to FIG. 3 showing a modification of the gripping mechanism for holding the nozzle onto the cylindrical assembly of the torch;

FIG. 13 is an enlarged, cross-sectional view taken generally along line 13-13 of FIG. 12;

PREFERRED EMBODIMENTS

Figure 1:
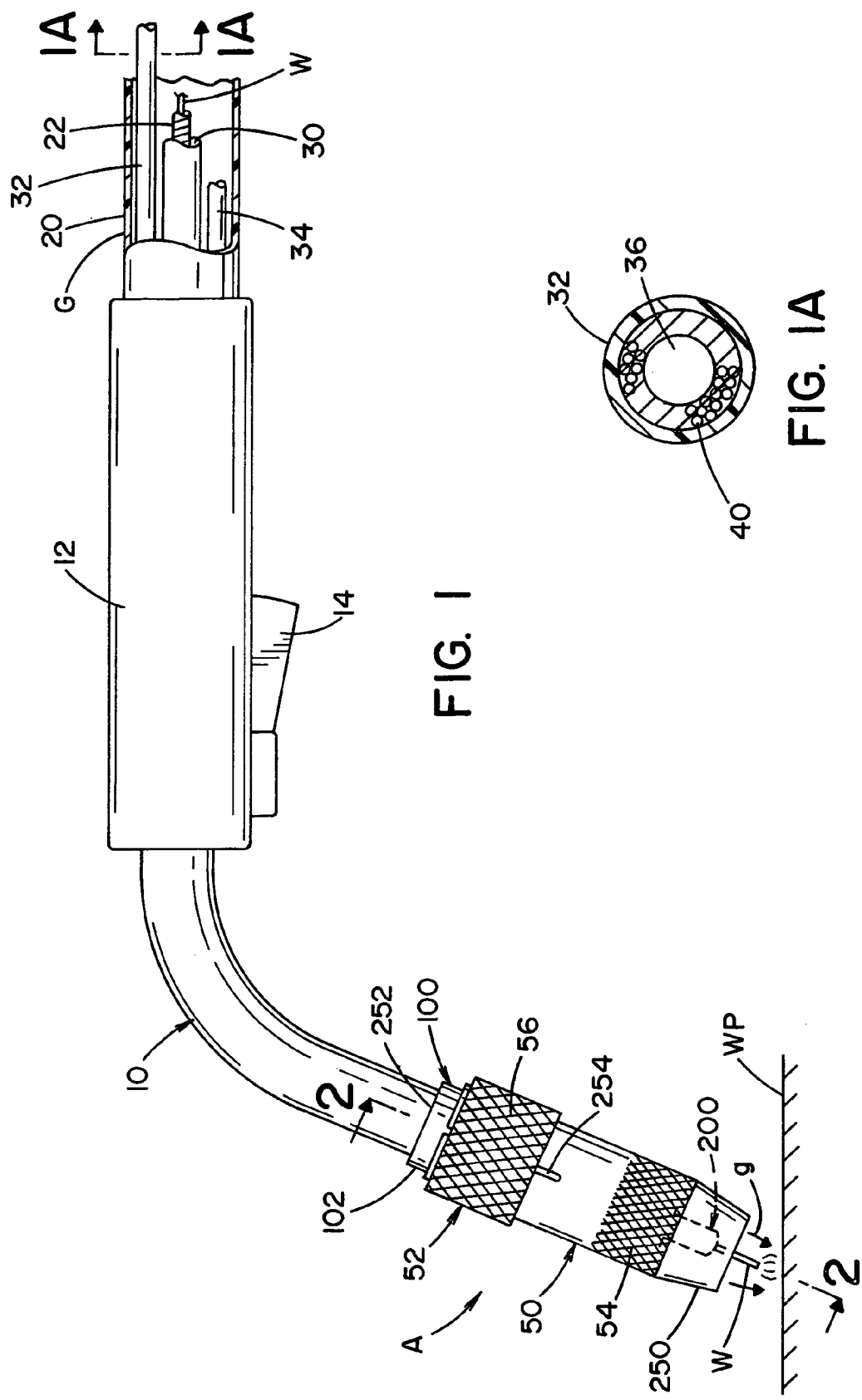
FIG. 1 is a pictorial, partially cross-sectioned view of an air cooled version of the present invention.

Referring now to FIGS. 1-7, the preferred embodiment of the present invention is illustrated as torch A, goose neck 10 extending from handle 12. An optional manually operated trigger 14 is illustrated for handle 12; however, in most embodiments, torch A is used in a robotic environment having no external trigger 14. The torch is at the front end of welding gun G, which gun is an elongated device extending from a wire feeder to the welding operation where wire W is melted and transferred to workpiece WP. The rear end of gun G, not shown, forms no part of the present invention except to realize that the gun includes a flexible tube 40 extending from rear wire feeder to handle 12 supporting torch A. Wire W of a given diameter is directed from the wire feeder to torch A through liner 22. Flexible, long tube 20 houses an inlet coolant conduit 32 and an outlet conduit 34 for directing coolant, such as water, into and away from torch A when the torch is a water cooled type torch as in the preferred embodiment of the invention. Each coolant conduit includes a central passage 36 surrounded by a braided or woven power lead 40. In this embodiment of the invention, two power leads are directed through goose neck 10 to the torch for the purpose of directing welding current of the desired magnitude and waveform into the torch. In accordance with standard technology, metal nozzle 50 is mounted over the end of torch A. In accordance with an aspect of the invention, nozzle A has a gripping device involving an actuator ring 52 rotated about the rear end of nozzle 50 by knurled sections 54, 56. Rotation of ring 52 tightens nozzle 50 onto insulation sleeve 100 using an aspect of the invention described later. Tube 20 houses wire W passing through liner 22 as well as defining the surrounding annulus shielding gas passage 30 so coolant moves in through conduit 32 and is withdrawn through conduit 34 as shown in FIG. 1. In practice, two power leads 40 around passages 36 are used for directing welding current to torch A.

Figure 2:
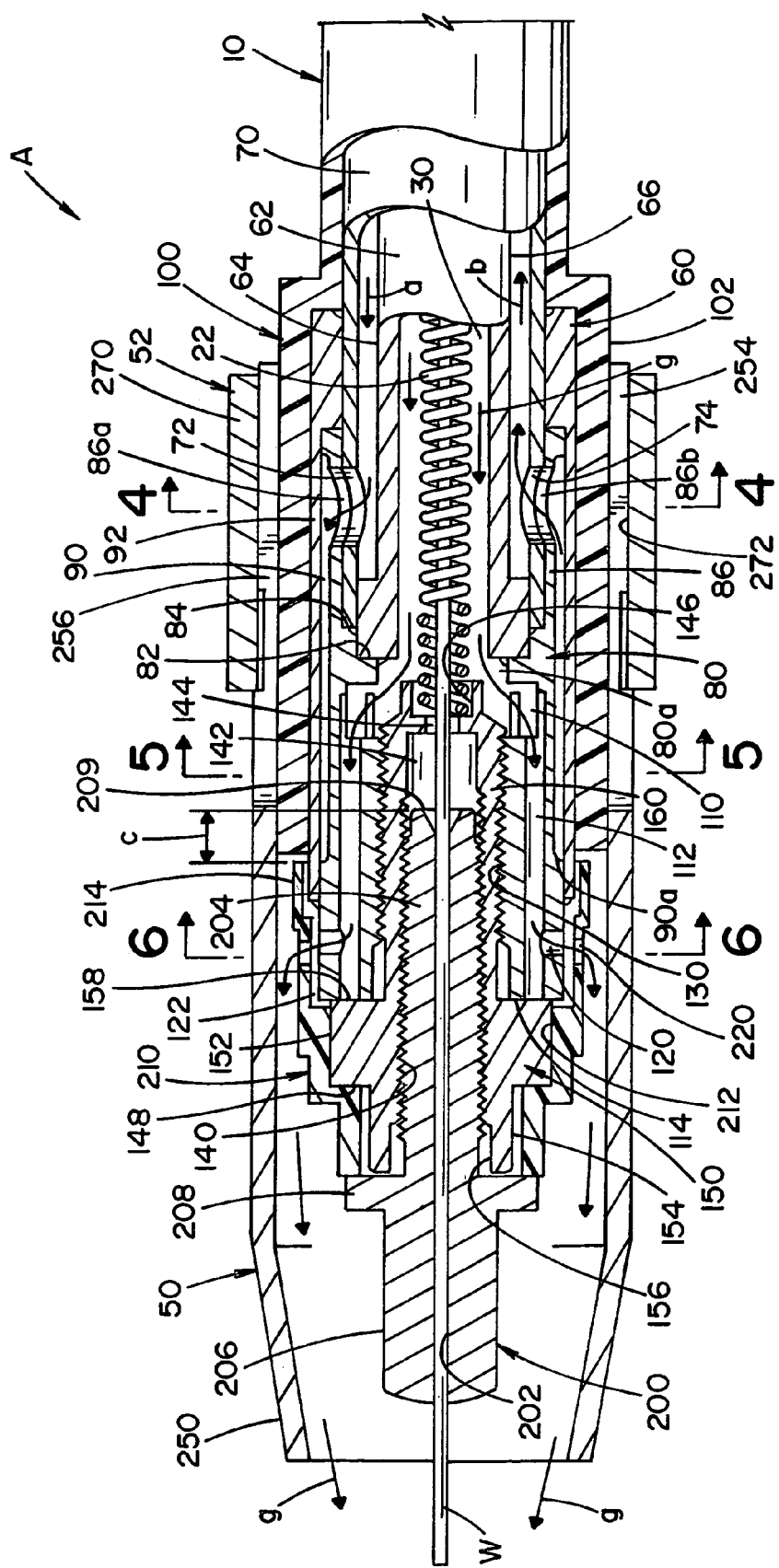
FIG. 2 is an enlarged, cross-sectional view of the torch taken generally along line 2-2 of FIG. 1.

As best shown in FIG. 2, torch A has an inner cylindrical main assembly 60. This is the main torch defining assembly and is used to conduct current from power leads 40 to wire W for the welding operation. Cylindrical main assembly includes several machined metal components all of which are supported onto a central support tube 62 having diametrically opposed flats 64, 66 wherein the inlet water passage is formed by flat 64 and the outlet water passage is formed by flat 66. The arrows a represent the inlet water movement and arrows b indicate the outlet water. Tube 70 is mounted on support tube 62 to close the water conduits formed by flats 64, 66 and provide diametrically opposed openings 72, 74.

To direct shielding gas g through nozzle 50, there is provided diffuser 80 as an integral part of conductive assembly 60. The rear section of the unitary diffuser includes opening 80a communicated with shielding gas passage 30. Shoulders 82, 84 locate cylindrical extension 86 around tube 70 with holes 86a, 86b aligning with outlet opening 72, 74 of fixed concentric tube 70. Thus, coolant flows on the outside of tube 62 through opening 72 and holes 86a into annular channel or chamber 90 closed by an outer concentric sleeve portion 92 abutted against the forward end of extension 86 to define outer coolant cylindrical chamber 90 having an outermost end 90a. Annular channel 90 is closed by concentric sleeve 92 abutting the back end of diffuser portion 80 of main assembly 60. These are the basic component of assembly 60 wherein diffuser 80 extends forward and is concentrically mounted with respect to tubes 62 and 70. Integral diffuser 80 has rear openings 80a communicated with shielding gas conduit 30 to provide shielding gas to the welding operation. As so far described, the rear of the diffuser and concentric tubes are used to communicate coolant liquid around torch A. Subsequent description will relate to the use of the front of the same diffuser for its primary purpose of directing shielding gas into the welding operation. Insulator sleeve 100 fixed around the rear of assembly 60 includes an outer surface 102 for mounting nozzle 50 in a manner to be described later. A different nozzle construction is illustrated in the three embodiments of the invention disclosed in this application.

In the preferred embodiment of the invention diffuser 80 is integral with assembly 60 by being a machine inner part of the assembly. This component performs the function of directing cooling liquid to the torch; however, the primary function of diffuser 80 is to provide shielding gas at the welding operation. To accomplish this primary function, diffuser 80 has an annular manifold 110 with axially defined ports 112 intersecting a lower surface 114. Axially machined orifices 120 intersect axial ports 112 to provide the orifices for diffuser 80 to direct shielding gas into a cylindrical chamber 122. The innermost portion of diffuser 80 is a threaded passage 130 to receive support nose 150. That defines a forward facing bore 140 of assembly 60. Bore 140 includes a rear end 142 having an opening 144 for wire W and a rearwardly facing nest or recess 146 for supporting the terminal end of liner 22. Support nose 150 is mounted in threaded passage 130 of the front part of the diffuser and includes forwardly facing, stepped cylindrical sections 152, 154 with clearance bore 156 for the wire. Rear surface 158 engages surface 114 of the diffuser to close axially extending ports 112 forcing shielding gas radially through diffuser orifices 120. Nose 150 has a rear threaded body 160 received in threaded passage 130 of diffuser 80. This body terminates in the rear opening 144 and nest recess 146 as previously described. Assembly 60 includes integral diffuser 80 and concentric tubes held together by nose 150. These fixed components form a conductive cylindrical assembly connected to power leads 140 for directing welding current from the power source to assembly 60. Assembly 60 is clamped together by threading nose 150 into openings 130 so it is a complete unit having forwardly facing threaded bore 140. That bore receives the contact tip 200 for guiding wire W to the welding operation and communicating electrical power to the advancing wire.

Figure 15:
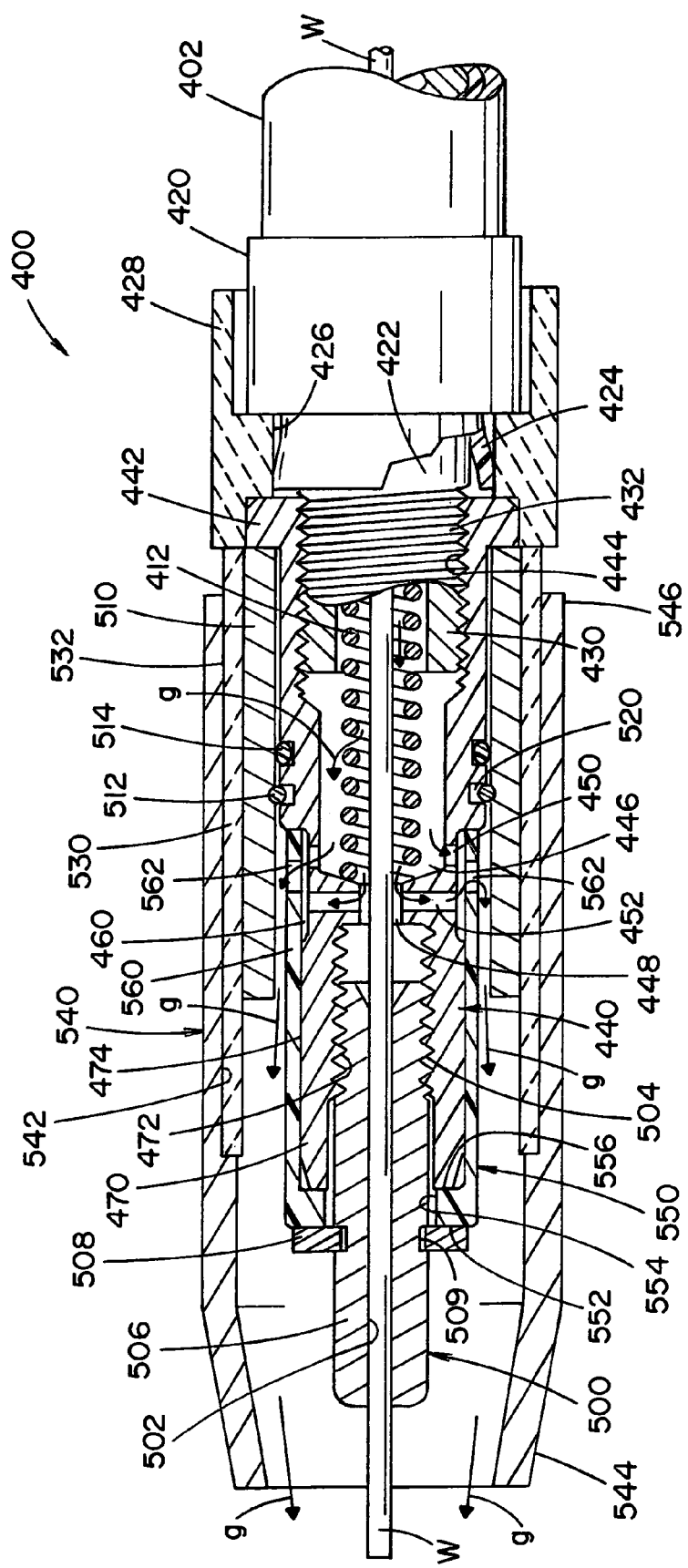

In accordance with the present invention, contact tip 200 is novel and includes a central wire guide passage 202 having a diameter slightly larger than the diameter of wire W. Rear threaded body 204 is threaded into bore 140 of assembly 60 and supports an outwardly protruding extension 206 defining the stick out of wire W during the welding operation. Radially extending flange 208 is mounted on tip 200 between threaded body 204 and extension 206. This radially extending flange is machined as part of the tip or it can be rotatably mounted on the tip as shown in FIG. 15. Innermost end 209 of body 204 is further inward than end 90a of annular channel 90. Thus, there is an overlap illustrated as c between the outermost position of the cooling water and the innermost position of tip 200.

Figure 3:
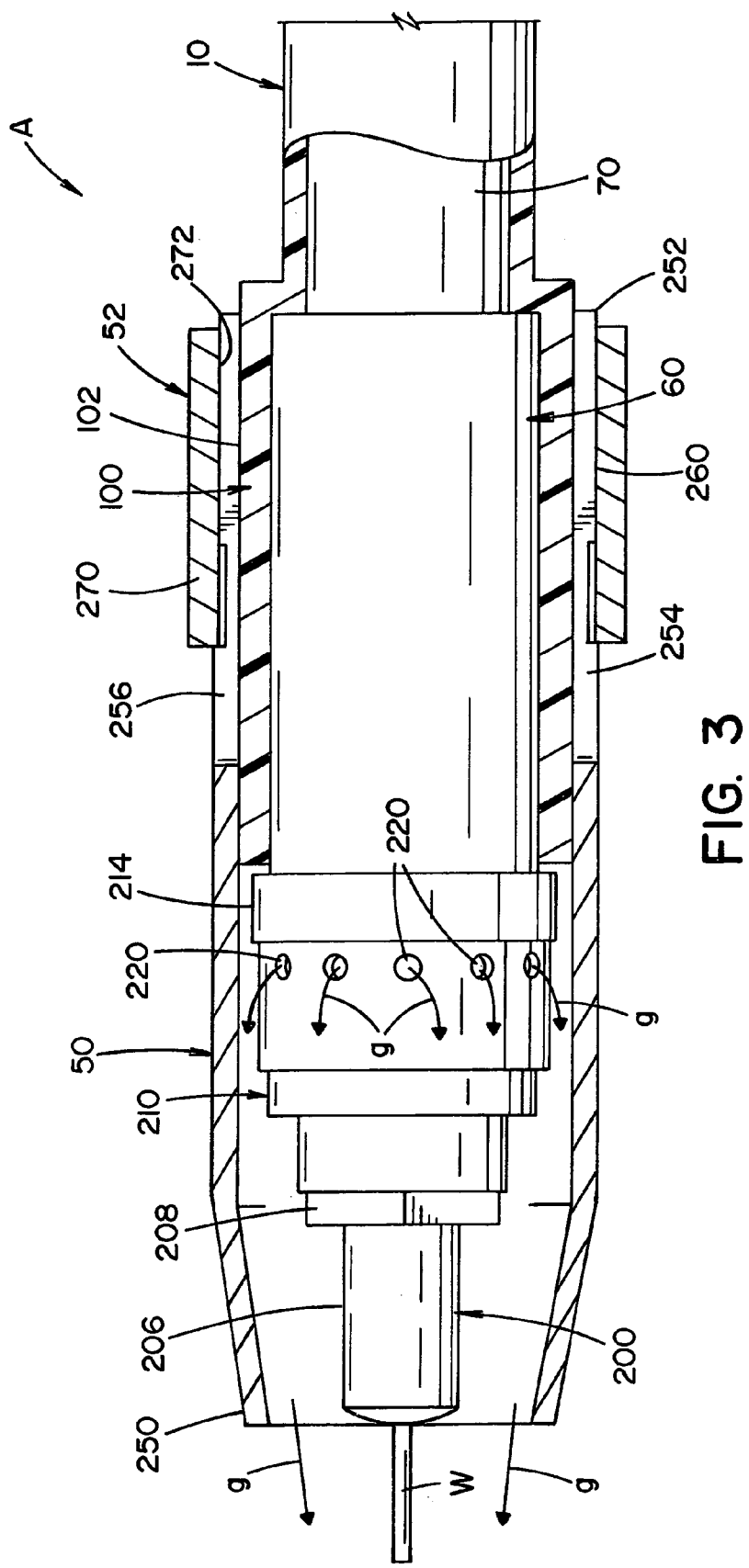
FIG. 3 is a simplified version of the torch illustrated in FIG. 2 showing the outer structure of the main assembly and illustrating certain improvements obtained by the present invention.
Figure 4:
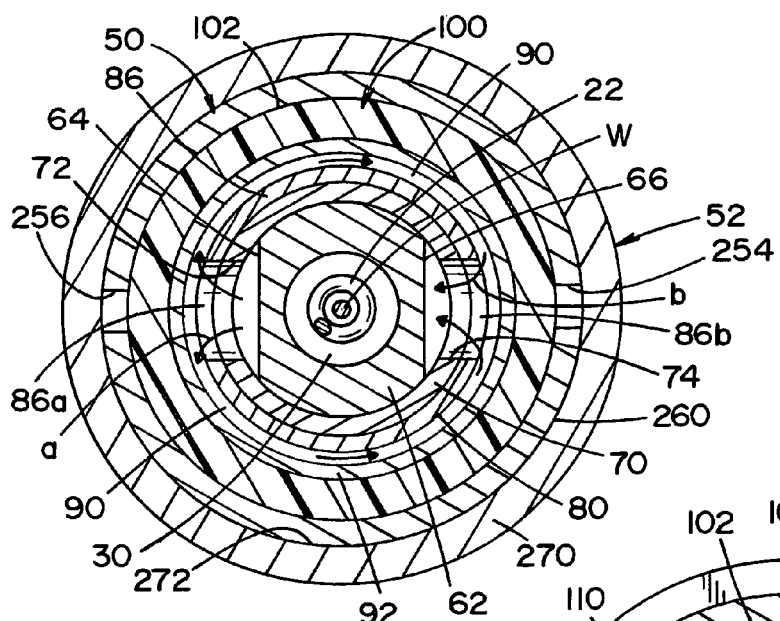
FIG. 4 is an enlarged, cross-sectional view taken generally along line 4-4 of FIG. 2.
Figure 5:
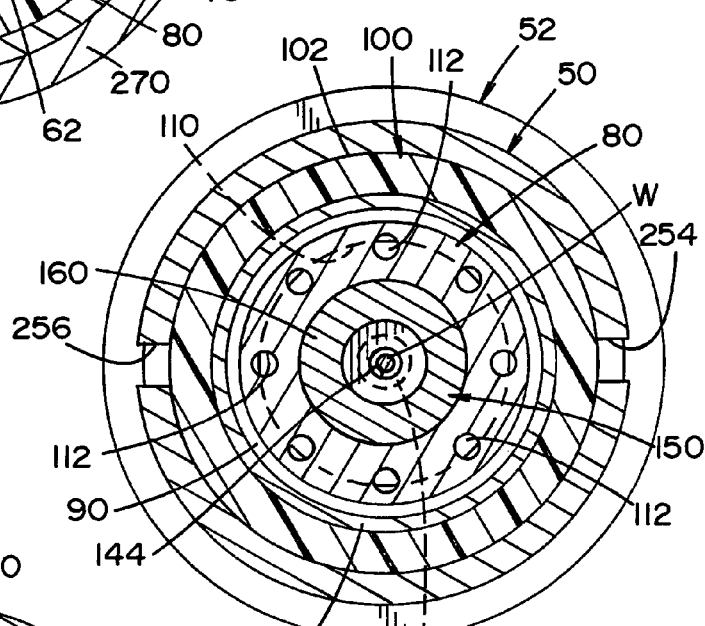
FIG. 5 is an enlarged, cross-sectional view taken generally along line 5-5 of FIG. 2.
Figure 6:
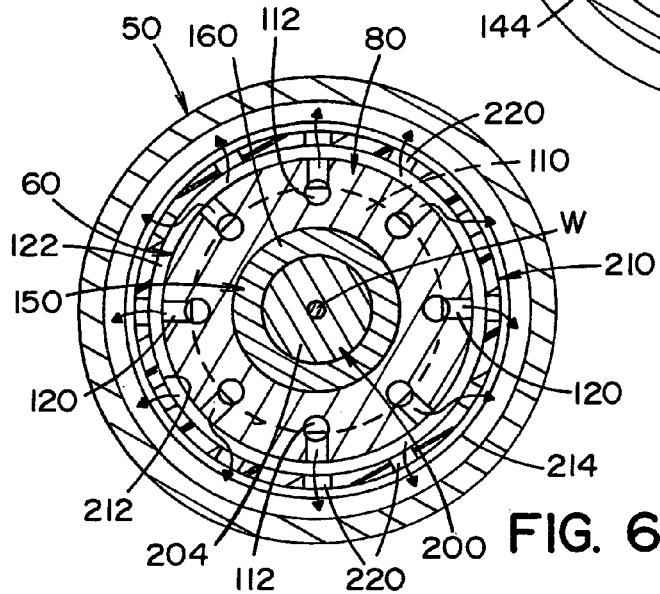
FIG. 6 is an enlarged, cross-sectional view taken generally along line 6-6 of FIG. 2.
Figure 7:
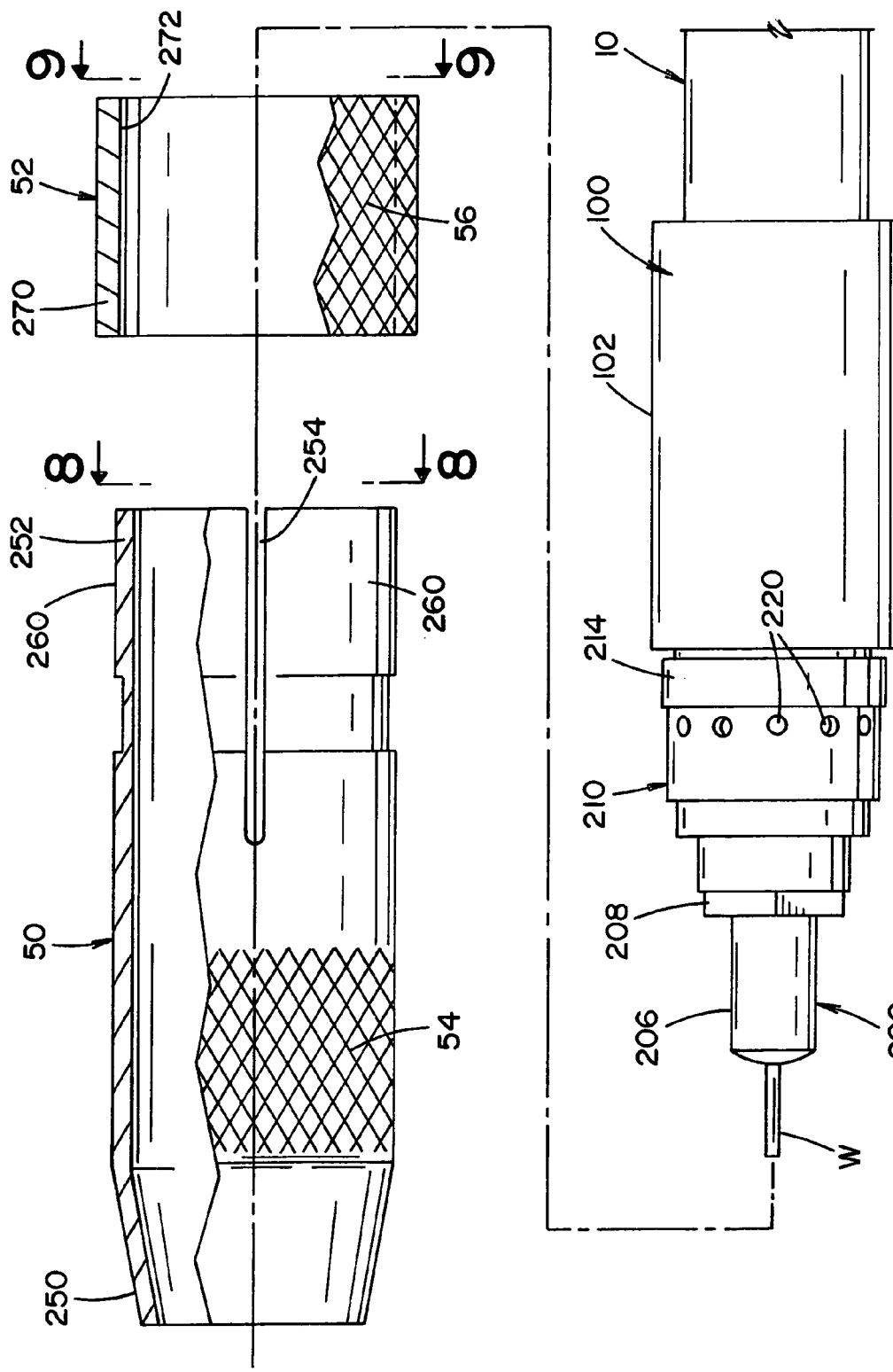
FIG. 7 is an exploded pictorial view of the torch components shown in FIG. 3.

Flange 208 holds protective sleeve 210 against shoulder 148 of support nose 150. This protective sleeve is formed from a thermoplastic heat resistant material, such as tetrafluoroethylene, and is molded or machined to match nose 150 by two step cavity 148. The first step centers sleeve 210 over nose 150 and the rearward step defines cup 214 having openings 220 communicated with cylindrical chamber 122 providing shielding gas from orifices 120. Openings 220, as best shown in FIGS. 3 and 7, are essentially aligned with orifices 120 to provide shielding gas in the annular passageway formed by replaceable metal orifice 50. The gas flow is substantially linear.

Figure 8:
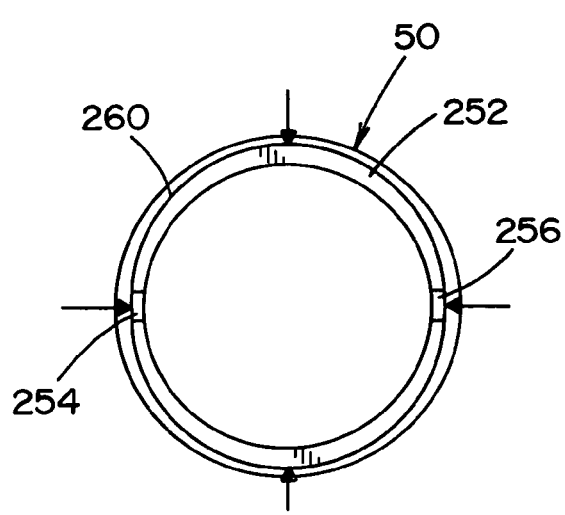
FIG. 8 is a view taken generally along line 8-8 of FIG. 7.
Figure 9:
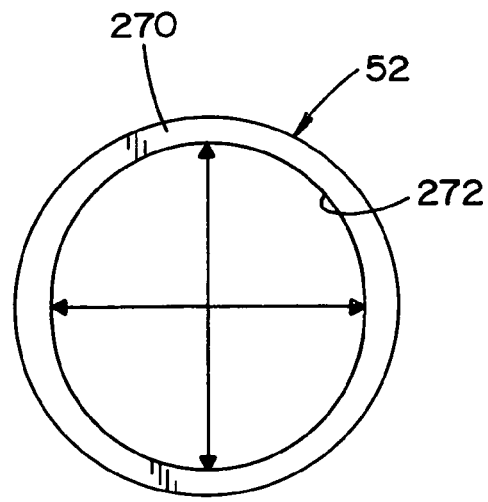
FIG. 9 is a view taken generally along line 9-9 of FIG. 7.
Figure 10:
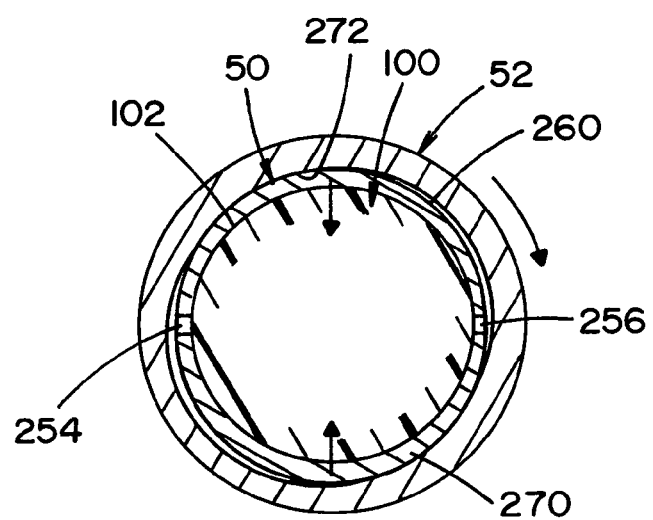
FIG. 10 is a schematic view illustrating the operating characteristics of the preferred gripping mechanism illustrated in FIGS. 7-9.

Nozzle 50 includes a front end 250 flared inwardly and a rear end 252 around the outer surface 102 of insulation sleeve 100. To hold nozzle 50 onto the torch by way of insulation sleeve 100, rear end 252 has one or more axially extending collapsible slots 254, 256 intersecting the outer surface 260 at the rear end of nozzle 50. Actuator ring 52 has an inner surface 270 and is slipped over and rotatable on outer surface 260 of rear end 252 of nozzle 50, as best shown in FIG. 7. As shown in FIGS. 8-10, surfaces 260, 270 are eccentric so that rotation of ring 52 over end 252 cams slots 254, 256 together to clamp the rear end of nozzle 50 onto insulation sleeve 100. As shown in FIGS. 1 and 7, knurled sections 54, 56 allow an operator to apply the necessary rotary force to forcibly clamp the nozzle onto torch A. This is the preferred gripping mechanism for the nozzle; however, other gripping mechanisms can be used and are shown in the other embodiments of the invention.

Figure 11:
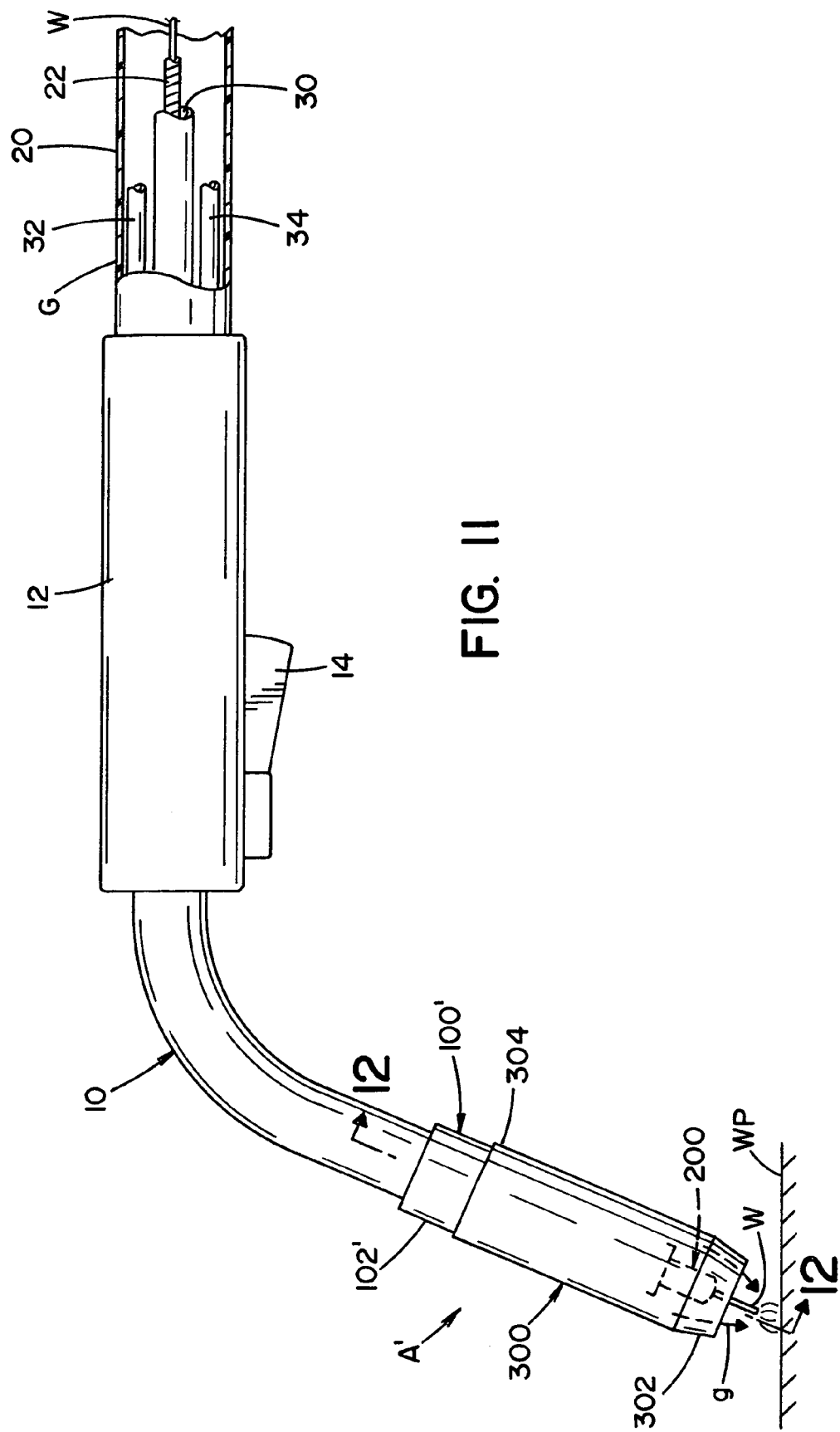
FIG. 11 is a view similar to FIG. 1 illustrating a modification of the water cooled torch of the preferred embodiment.

A second embodiment of a water cooled version of the present invention is illustrated in FIGS. 11-13 wherein the numbers of like components from the first embodiment are numbered the same. The basic difference relates to the gripping mechanism at the rear end of the nozzle. Torch A' has an insulation sleeve 100' with an outer cylindrical surface 102'. Nozzle 100 has a front end 302 with a gas directing flare and a rear end 304 with an inner cylindrical surface 306 generally matching surface 100'. The gripping mechanism of nozzle 300 includes a circumferentially extending groove 310 in sleeve 100'. The groove receives snap ring 312 which expands outwardly from surface 102'. Rearward of groove 310 is a second groove 320 for a circular sealing ring 322. In the illustrated torch, end 302 of nozzle 300 has two snap ring receiving grooves 330, 332. As the nozzle is pushed rearward over the torch, snap ring 312 extends into groove 310 and seal 322 provides a gas seal at the rear of the nozzle. To provide a second axial position of nozzle 300, the nozzle is merely forced rearward beyond groove 310 until ring 312 snaps into groove 320. In both instances, there is a rear seal by sealing ring 322. This is a further arrangement for mounting the nozzle onto the welding torch.

Figure 14:
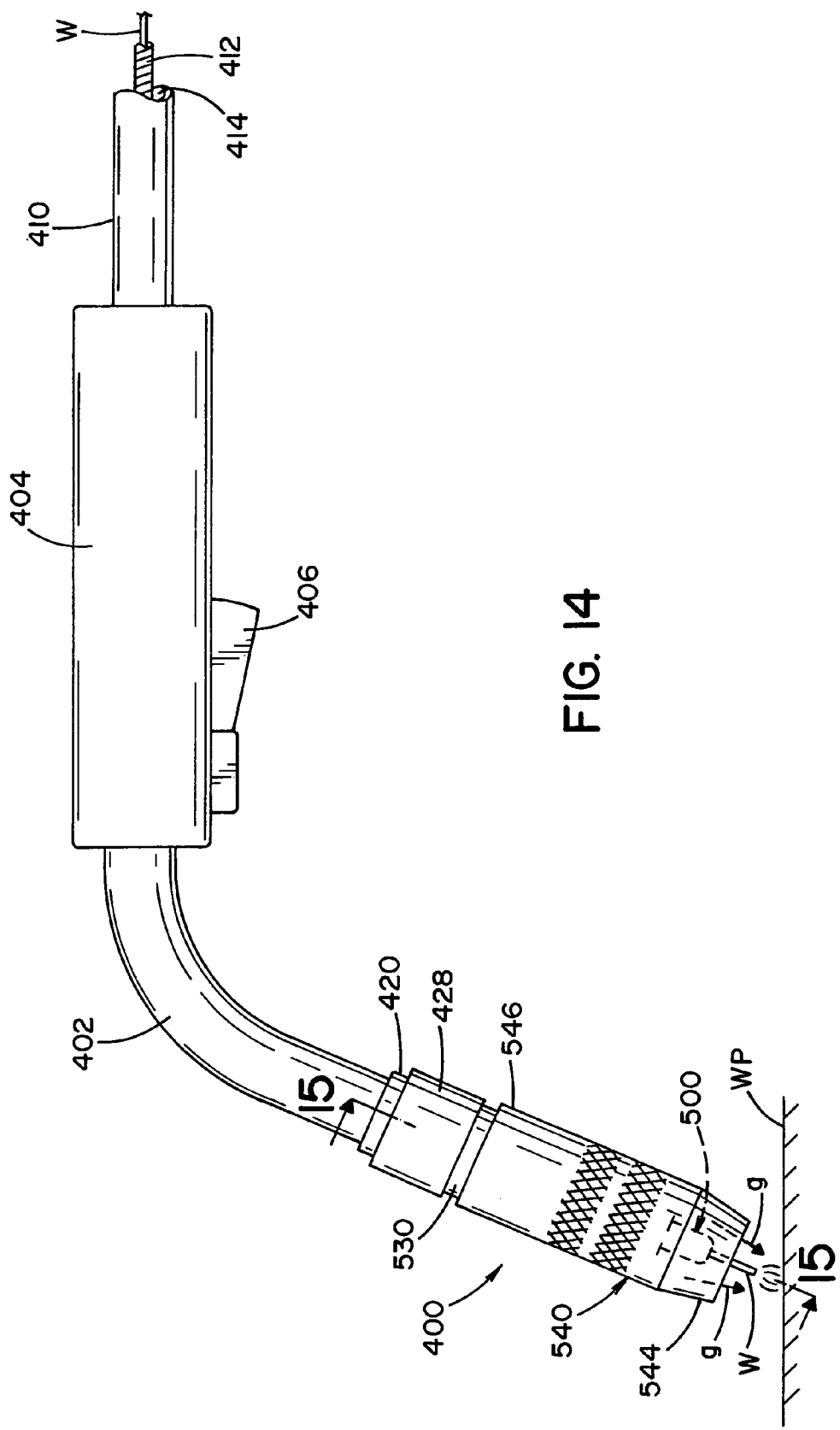
FIG. 14 is a side elevational view of the air cooled version of the present invention and similar to the illustrations in FIGS. 1 and 11 corresponding to the water cooled versions of the present invention with a further modification in the nozzle for the torch; and, FIG. 15 is an enlarged, cross-sectional view taken generally along line 15-15 of FIG. 14.

The preferred implementation of the present invention is in a water cooled torch as shown in FIGS. 1-13; however, some of the same inventive concepts can be employed in an air cooled torch, such as schematically illustrated in FIGS. 14 and 15. Torch 400 is attached to goose neck 402 extending from handle 404 and having an optional trigger 406, as previously described. Flexible tube 410 extends from a wire feeder to handle 404 for directing wire W through liner 412 and shielding gas through annular passage 414. There are no coolant passages; however, a power lead, or two power leads, are directed from the power source to the torch through annular passage 414 of tube 410. The illustrated embodiment includes metal connector 420 with a forwardly cylindrical projection 422 supporting an annular seal 444 between projection 422 and inner recess 426 of insulator 428. The insulator is clamped between connector 420 and the main cylindrical support member 440 which is drawn toward the connector by stub shaft 430 through the use of outer threads 432. Shielding gas is directed through connector 420 into main support member 440. This support member provides a cylindrical main assembly as in the prior water cooled torches. Member 440 is a machined cylindrical member having a rear end flange 442 surrounding threaded bore 444 used to draw member 440 toward connector 420 to clamp these two structures on insulator 428. To support the forward end of liner 412, support member 440 includes a rearwardly facing nest portion 446 surrounding a wire opening 448. The main support member is machined to define a forwardly directed diffuser section having circumferentially spaced diffuser openings 450 and bled passages 452 so shielding gas g from annular passage 414 is directed through threaded bore 444 and into both the radial orifices 450 and the bled ports 452. This communicates shielding gas with annular distribution chamber 460 for use in the welding operation. As in the first embodiment of the invention, main assembly 440 includes a front support nose 470. This unit has the nose machined as a part of the total assembly. This nose defines forwardly facing threaded bore 472 and outer surface 474. As in the previous embodiments of the invention, torch 400 includes a central cylindrical support assembly with a forwardly facing diffuser having radially directed orifices and a nose with a threaded bore facing forward. This bore receives contact tips 500 having a central wire guide bore 502 or passage and a threaded rear body 504. To position the wire adjacent workpiece WP, contact tip 500 has a forward extension 506. The extension and rear body are on opposite sides of a radially extending flange 508, which is illustrated as rotatable in a slot 509 of tip 500. Around support member 440 is a brass mounting sleeve 510 with an inner cylindrical surface acted upon by outwardly biased snap ring 512 and circular ring seal 514 carried on the outer surface of member 440. Groove 520 on the inner surface of sleeve 510 coacts with snap ring 512 to hold brass sleeve 510 in a position around member 440. In this manner, brass sleeve 510 is releasably mounted on support member 540 to receive an outer ceramic sleeve 530 which is held by friction over the outer surface of brass sleeve 510. Ceramic support sleeve 530 has an outer cylindrical surface 532 which coacts with a recessed surface 542 to hold metal nozzle 540 in the position shown in FIG. 15. In this manner, nozzle 540 is held on torch 400 by friction force between the outer cylindrical surface 532 and the recessed inner cylindrical surface 542. Of course, this type of nozzle could be used in the other two embodiments. In a like fashion, the nozzles in the other two embodiments could be used in the torch shown in FIGS. 14 and 15.

Torch 400 includes a protective sleeve 550 with the same attributes and functions as protective sleeve 510 of the two water cooled embodiments. Sleeve 550 is held on the end of member 440 by flange 508 of tip 500. The flange engages front end 552 having central opening 554. Shoulder 556 clamps end 552 against the outermost end of member 440. This action mounts and holds sleeve 550 around the outer nose portion of assembly 440 while rearwardly extending cup section 560 surrounds orifices 450 and includes circumferentially spaced openings 460 communicated with the diffuser orifices by way of intermediate chamber 460. This is the same operation as in the other embodiments wherein the protective sleeve is mounted over the outer nose of the main conductive assembly of the torch and extends rearwardly to provide openings communicating the diffuser openings so the annular passage created by the outer metal nozzle can direct an efficient gas flow to the welding operation. The protective sleeve has the same advantages as previously described sleeves. It protects the end of the conductive assembly that supports the contact tip and the outer diffuser openings fo shielding gas.

Having thus defined the invention, the following is claimed:

1. A torch for directing a welding wire with a given diameter toward a workpiece, said torch comprising: a main cylindrical conductive assembly having a diffuser for directing shielding gas outwardly from said assembly; a contact tip having a central wire guide bore; and, a cylindrical metal nozzle with a rear end held on said main assembly, wherein said rear end of said cylindrical metal nozzle includes a gripping mechanism, said gripping mechanism including: a first generally cylindrical collet as the rear end of said nozzle and having an outwardly facing surface and at least one axially extending collapsible slot extending through a thickness of said rear end; and a second generally cylindrical actuator ring with an inner generally cylindrical surface sliding around said outwardly facing surface, where at least one of said surfaces is slightly non-circular whereby rotation of said actuator ring on said collet at least partially closes at least one collapsible slot to clamp said rear end of said nozzle onto said cylindrical assembly.

2. A torch as defined in claim 1 wherein said cylindrical assembly includes a coolant passage with an inlet conduit and an outlet conduit formed in said assembly.

3. A torch as defined in claim 2 wherein coolant passage is cylindrical and coaxial with said threaded bore.

4. A torch as defined in claim 3 wherein said coolant passage has a front-most portion and said threaded rear body has a rear-most portion with said portions overlapping.

5. A torch as defined in claim 2 wherein said coolant passage has a front-most portion and said threaded rear body of the contact tip has a rear-most portion with said portions overlapping.

6. A torch as defined in claim 2 wherein said contact tip includes a radially extending flange between a rear body and a front extension of the tip to hold a protective sleeve about a portion of the diffuser when the rear body is positioned within said main assembly.

7. A torch as defined in claim 6 wherein said flange is rotatably mounted on said contact tip.

8. A torch as defined in claim 6 wherein said cylindrical protective sleeve is formed from a heat resistant, non-magnetic material.

9. A torch as defined in claim 8 wherein said cylindrical protective sleeve is formed from a thermoplastic material.

10. A torch as defined in claim 9 wherein said sleeve is formed from tetrafluoroethylene.

11. A torch as defined in claim 6 wherein said sleeve has a first cylindrical internal cavity matching a cylindrical support nose and a second cylindrical internal cavity matching said diffuser where said cavities are cylindrical with the second cavity having a diameter greater than the diameter of said first cavity.

12. A torch as defined in claim 7 wherein said sleeve has a first cylindrical internal cavity matching a cylindrical support nose and a second cylindrical internal cavity matching said diffuser where said cavities are cylindrical with the second cavity having a diameter greater than the diameter of said first cavity.

13. A torch as defined in claim 11 wherein said cavities are machined into said protective sleeve.

14. A torch for directing a welding wire with a given diameter toward a workpiece, said torch comprising: a main cylindrical conductive assembly having a diffuser for directing shielding gas outwardly from said assembly; a contact tip having a central wire guide bore; and, a cylindrical metal nozzle with a rear end held on said main assembly, wherein said rear end of said cylindrical metal nozzle includes a gripping mechanism, said gripping mechanism including a first cylindrical surface fixed with respect to said cylindrical assembly, said first surface having a groove with a snap ring protruding from said first surface and said rear end of said nozzle including an inner surface generally matching said first surface with a plurality of annular grooves, each of the plurality of grooves being arranged to selectively receive and hold said snap ring when said inner surface is slipped axially over said first surface, and thereby position nozzle in one of a plurality of axial positions relative to said cylindrical assembly.

15. A torch as defined in claim 14 wherein said inner surface includes a sealing groove behind said first mentioned groove with a sealing ring in said sealing groove to create a seal with said inner surface when said snap ring is in a receiving groove.

16. A torch as defined in claim 14 wherein said inner surface includes a second groove behind said first mentioned groove with a sealing ring in said second groove to create a seal with said inner surface when said snap ring is in a receiving groove.

17. A torch for directing a welding wire with a given diameter toward a workpiece, said torch comprising: a main cylindrical conductive assembly having a diffuser for directing shielding gas outwardly from said assembly; a contact tip having a central wire guide bore; and, a cylindrical metal nozzle with a rear end held on said main assembly, wherein said rear end of said cylindrical metal nozzle includes a gripping mechanism, said gripping mechanism including a first cylindrical friction surface fixed with respect to a cylindrical surface of the main assembly, and an inner cylindrical friction surface of said rear end of said nozzle, the inner friction surface generally matching said first friction surface to hold said nozzle onto said first friction surface by frictional force.

18. A torch as defined in claim 14 wherein said diffuser and said nose are integral.

19. A torch as defined in claim 18 wherein said integral relationship is formed by threading said nose into said diffuser.

20. A torch as defined in claim 17 wherein said diffuser and said nose are integral.

21. A torch as defined in claim 20 wherein said integral relationship is formed by threading said nose into said diffuser.

22. A torch as defined in claim 2 wherein said diffuser and said nose are integral.

23. A torch as defined in claim 22 wherein said integral relationship is formed by threading said nose into said diffuser.

24. A torch as defined in claim 1 wherein said diffuser and said nose are integral.

25. A torch as defined in claim 24 wherein said integral relationship is formed by threading said nose into said diffuser.

26. A torch as defined in claim 17 wherein said cylindrical assembly includes a coolant passage with an inlet conduit and an outlet conduit formed in said assembly.

27. A torch as defined in claim 26 wherein said coolant passage has a front-most portion and said threaded rear body has a rear-most portion with said portions overlapping.

28. A torch as defined in claim 14 wherein said cylindrical assembly includes a coolant passage with an inlet conduit and an outlet conduit formed in said assembly.

29. A torch as defined in claim 28 wherein said coolant passage has a front-most portion and said threaded rear body has a rear-most portion with said portions overlapping.

30. A cylindrical metal nozzle for use on a torch for directing welding wire toward a workpiece, said nozzle including a rear mounting end and a front end for directing shielding gas around a wire issuing from said front end, said rear end including a gripping mechanism for attaching said nozzle to said main assembly, said gripping mechanism including a generally cylindrical collet as the rear end of said nozzle and having at least one axially extending collapsible slot extending through a thickness of said rear end; and an outwardly facing surface and a generally cylindrical actuator ring with an inner generally cylindrical surface where at least one of said surfaces is slightly non-circular whereby rotation of said actuator ring on said collet at least partially closes said at least one collapsible slot by a camming action to clamp said rear end of said nozzle onto said torch.

31. A cylindrical metal nozzle for use on a torch for directing welding wire toward a workpiece, said nozzle including a rear mounting end and a front end for directing a shielding gas around a wire issuing from said front end, said rear end including an inner cylindrical surface with a plurality of snap ring receiving grooves, each of said grooves adapted to selectively receive a snap ring carried on the outer cylindrical surface of said torch to provide a plurality of axial mounting positions for said nozzle upon said torch.

32. A torch as defined in claim 1 further including a cylindrical insulator sleeve surrounding said main assembly, wherein said gripping mechanism clamps said nozzle to said insulator sleeve.

33. A torch as defined in claim 14 further including a cylindrical insulator sleeve surrounding said main assembly, wherein said gripping mechanism clamps said nozzle to said insulator sleeve.

34. A torch as defined in claim 17 further including a cylindrical insulator sleeve surrounding said main assembly, wherein said gripping mechanism clamps said nozzle to said insulator sleeve.

35. A torch as defined in claim 17 wherein said first friction surface is ceramic.

36. A torch as defined in claim 17 wherein said first friction surface is an outer cylindrical surface of a sleeve positioned between said nozzle and the main assembly.

* * * * *